(12) United States Patent
Rasmus et al.

(10) Patent No.: US 10,053,979 B2
(45) Date of Patent: Aug. 21, 2018

(54) CHARACTERIZATION OF NON-RADIOACTIVE LACED CEMENT USING LOGGING WHILE DRILLING AND WIRELINE NUCLEAR MEASUREMENTS

(71) Applicant: Schlumberger Technology Corporation, Sugar Land, TX (US)

(72) Inventors: John Rasmus, Richmond, TX (US);
Alex Ahrenst, Sugar Land, TX (US);
Ana Peternell, Youngsville, LA (US);
Jeffrey Miles, Arlington, MA (US);
Martinus Johannes Bernardus Bogaerts, Rosenberg, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/274,277

(22) Filed: Sep. 23, 2016

(65) Prior Publication Data

US 2018/0087376 A1    Mar. 29, 2018

(51) Int. Cl.
| | |
|---|---|
| *E21B 49/00* | (2006.01) |
| *G01V 5/10* | (2006.01) |
| *E21B 33/14* | (2006.01) |
| *E21B 43/26* | (2006.01) |
| *E21B 43/267* | (2006.01) |
| *E21B 47/00* | (2012.01) |

(52) U.S. Cl.
CPC .............. *E21B 49/00* (2013.01); *E21B 33/14* (2013.01); *E21B 43/267* (2013.01); *E21B 47/0005* (2013.01); *G01V 5/101* (2013.01)

(58) Field of Classification Search
CPC .... E21B 33/14; E21B 43/267; E21B 47/0005; E21B 49/00; G01V 5/101
See application file for complete search history.

(56) References Cited

U.S. PATENT DOCUMENTS

| | | |
|---|---|---|
| 4,731,531 A | 3/1988 | Handke |
| 5,783,822 A | 7/1998 | Buchanan et al. |
| 6,691,780 B2 | 2/2004 | Nguyen et al. |
| 6,703,606 B2 | 3/2004 | Adolph |
| 6,781,115 B2 | 8/2004 | Stoller et al. |
| 8,100,177 B2 | 1/2012 | Smith, Jr. et al. |

(Continued)

FOREIGN PATENT DOCUMENTS

EP         443936 A1    2/1991

OTHER PUBLICATIONS

Beekman et al., "Downhole X-Ray Radiation Detector Systems and Methods", U.S. Appl. No. 15/393,793, filed Dec. 29, 2016; 42 pages.

(Continued)

*Primary Examiner* — Mark R Gaworecki

(57) ABSTRACT

A method of performing a wellbore operation includes: circulating a doped wellbore fluid comprising a non-radioactive doped particulate material in a wellbore; and logging the wellbore with a logging-while-drilling tool to determine at least one characteristic of the doped wellbore fluid. A method of performing a wellbore operation includes: circulating a doped wellbore fluid comprising a non-radioactive doped particulate material in a wellbore; logging the wellbore with a logging tool; and determining a location of at least one fracture by elemental spectroscopy measurements.

20 Claims, 3 Drawing Sheets

(56) References Cited

U.S. PATENT DOCUMENTS

| | | |
|---|---|---|
| 8,637,806 B2 | 1/2014 | Kwong et al. |
| 9,006,645 B2 | 4/2015 | Kwong et al. |
| 2009/0087911 A1 | 4/2009 | Ramos |
| 2014/0034823 A1 | 2/2014 | Hyde-Barber |
| 2015/0124921 A1 | 5/2015 | Groves et al. |
| 2015/0144340 A1* | 5/2015 | Surjaatmadja ........ E21B 29/005 166/298 |
| 2015/0185362 A1 | 7/2015 | Kwong et al. |
| 2016/0024909 A1* | 1/2016 | Han .................... E21B 47/1015 166/250.1 |
| 2016/0326865 A1* | 11/2016 | Zhang ..................... G01V 5/06 |

OTHER PUBLICATIONS

International Search Report issued in International Patent Appl. No. PCT/US2017/052854 dated Jan. 31, 2018; 3 pages.

Written Opinion issued in International Patent Appl. No. PCT/US2017/052854 dated Jan. 31, 2018; 9 pages.

* cited by examiner

CHARACTERIZATION OF NON-RADIOACTIVE LACED CEMENT USING LOGGING WHILE DRILLING AND WIRELINE NUCLEAR MEASUREMENTS

BACKGROUND

When a well drilled for oil prospecting reaches a given depth, a casing is generally inserted down the well to said depth and cement is injected into the annular space surrounding the casing so as to hold and otherwise support the casing in place and also to isolate the various formations through which the well passes from one another so that fluid migration does not occur. For example, it would be detrimental to production if fluid were to pass from a water-bearing formation to an oil-bearing formation along an un-cemented or insufficiently cemented casing. During the cementing operation, the cement is usually injected/introduced into the wellbore through the casing and subjected to pressure whereupon the cement will flow out of the bottom of the casing and then upwardly within the annular space between the casing and the formation. Many cementing protocols involve emplacing cement at least 500 feet above the flow zone.

Effectively placing cement in the annular space located between casing and formation is a challenging operation. The drilling mud originally in place in the annulus at the end of the drilling phase must be fully displaced and replaced by the cement slurry. One challenge is that the total volume of the annulus and thus the amount of cement slurry needed for a particular casing job is often not well characterized. Another challenge comes from the fact that the annulus is not concentric: despite the use of centralizers, the casing string will lean towards the bottom of the hole in deviated or horizontal wells. A second challenge is related to the nature of the drilling mud and cement slurry: they are both viscoplastic and exhibit a yield stress. As a result they can remain unyielded in the narrow part of the eccentric annulus, thus preventing correct placement of the cement slurry. Further complicating matters is that during cement placement losses are often encountered, resulting in drilling fluid and cement to leak off into the formation and therefore not be properly placed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of performing a wellbore operation that includes: circulating a doped wellbore fluid comprising a non-radioactive doped particulate material in a wellbore; and logging the wellbore with a logging-while-drilling tool to determine at least one characteristic of the doped wellbore fluid.

In another aspect, embodiments disclosed herein relate to a method of performing a wellbore operation that includes: circulating a doped wellbore fluid comprising a non-radioactive doped particulate material in a wellbore; logging the wellbore with a logging tool; and determining a location of at least one fracture by elemental spectroscopy measurements.

In yet another aspect, embodiments disclosed herein relate to a method of performing a wellbore operation that includes: circulating a doped cement fluid comprising a non-radioactive doped particulate material in a wellbore and into an annulus between a formation wall and a casing string; logging the wellbore with a logging tool; and determining at least one characteristic of the doped cement fluid by sigma measurements.

In yet another aspect, embodiments disclosed herein relate to a method of performing a wellbore operation that includes: circulating a doped wellbore fluid comprising 0.25% to 5% by weight of a non-radioactive doped particulate material in a wellbore; and logging the wellbore with a logging system having a neutron source.

Other aspects and advantages of the claimed subject matter will be apparent from the following description and the appended claims.

DETAILED DESCRIPTION

Figure 1:
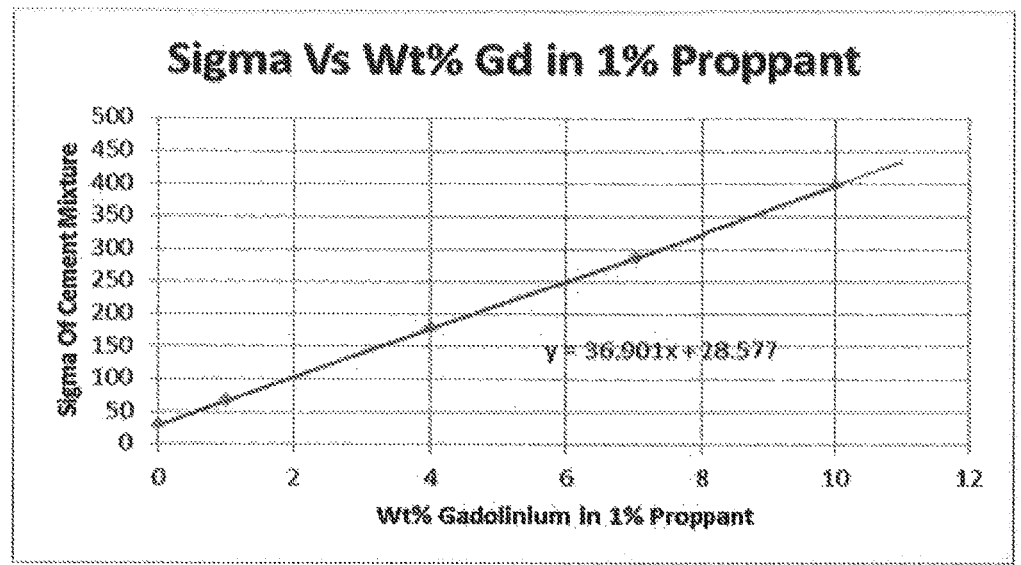
FIG. 1 shows a plot of the sigma of the doped particulate material containing cement of Example 1 as a function of the gadolinium concentration in the doped particulate material.

Embodiments disclosed herein relate generally to wellbore fluid compositions (such as, but not limited to, cementing fluids) containing non-radioactive elements as tracers and methods of using said compositions during wellbore operations. In the context of cementing fluids used to cement casing strings in place in a wellbore, currently, operators may often use estimates or take indirect measurements to know where the top of the cement is in the annular space (i.e., the uppermost extent of the cement in the annulus between the formation wall and the casing string (or between concentric casing strings)), or to know whether the cement is isolating the formations satisfactorily at various depths in order to avoid any fluid intercommunication. These methods may have a significant amount of error and/or may take considerable time and effort to perform. For example, current methodologies may require tripping out the tools used to emplace the cement so that specialized tools can be inserted via wireline into the wellbore to collect the measurements. More direct measurements may be taken with radioactive tracers added to the cement or wellbore fluid but they are generally avoided due to the difficulty and hazards involved with the handling and use of radioactive materials.

The present disclosure uses wellbore fluid compositions containing non-radioactive elements as tracers to perform measurements (including but not limited to top of cement) more easily, directly, and unambiguously. Generically, the non-radioactive elements are added to at least a portion of the cement or other wellbore fluid compositions prior to their introduction or pumping downhole. Logging tools and their accompanying surface acquisition systems are subsequently used to measure various characteristics of the introduced cement or wellbore fluids, and in particular to trace the location and/or placement of the traced fluid within the near wellbore region, for example. The measurements obtained by the logging tools may be nuclear measurements that are particularly sensitive to the presence of the non-radioactive elements added to the wellbore fluid. For example, the magnitude of the signal measured may be a function of the concentration of the non-radioactive elements within the volume under investigation by the instrument.

In one or more embodiments, the non-radioactive elements of the present disclosure may be included as a component or dopant of a particulate material that can then be added to the wellbore fluid compositions of the present disclosure. According to one or more embodiments of the present disclosure, the wellbore fluid composition includes a doped particulate material that includes non-radioactive elements that have high thermal neutron capture cross-sections. More specifically, the doped particulate material is doped with non-radioactive elements that have high thermal neutron capture cross-sections and as a result the doped particulate material has a thermal neutron capture cross-section exceeding that of elements/compounds normally encountered in subterranean zones. According to one or more embodiments of the present disclosure, the doped particulate material has a macroscopic thermal neutron capture cross-section of at least about 90 capture units, and up to about 900 capture units or more. In one or more embodiments, the doped particulate material is a granular ceramic material, with substantially every grain of the doped particulate material having non-radioactive elements that have high thermal neutron capture cross-sections integrally incorporated therein.

In one or more embodiments, the non-radioactive elements/dopants included in the particulate material may be selected from boron, cadmium, gadolinium, iridium, manganese, or mixtures thereof. In one or more embodiments, high capture cross-section materials that may be included as components within the doped particulate material to provide the non-radioactive elements indicated above may include boron carbide, boron nitride, boric acid, high boron concentrate glass, zinc borate, borax, gadolinium oxide, manganese oxides, and combinations thereof. In one or more embodiments, the doped particulate material may include about 0.025% to about 10% by weight, or about 1% to about 8.5% by weight, or about 3.5% to about 7.25% by weight, or about 4.5% to 6.5% by weight of the non-radioactive elements/dopants that have high thermal neutron capture cross-sections. Skilled artisans will understand that the concentration of dopant needed for a particular application may depend on the magnitude of the tool response to the particular dopant used. Thus, the weight percent of dopant in the doped particulate material may vary depending on the capabilities of the tool used to detect the dopant and with the characteristics of the particular dopant used.

According to one or more embodiments of the present disclosure, the doped particulate material may be a ceramic proppant, sand, resin coated sand, plastic beads, glass beads, and other ceramic or resin coated proppants. Such doped particulate materials may be manufactured according to any suitable process including, but not limited to continuous spray atomization, spray fluidization, spray drying, or compression. In one or more embodiments, the doped particulate material may be a silica particulate that is doped with non-radioactive elements that have high thermal neutron capture cross-sections.

In one or more embodiments, the doped particulate materials may have a particle size ranging from about 100 micron to 1000 micron, or from about 125 micron to 975 micron, or from about 175 to 925 micron. In one or more embodiments, the doped particulate materials may have a particle size ranging from about 100 to 500 microns, or from about 125 to 475 microns, or from 150 to 450 microns. In one or more embodiments, the doped particulate materials may have a particle size ranging from about 325 micron to 1000 microns, or from about 350 microns to 975 microns, or from about 375 to 950 microns. In particular embodiments, the doped particulate materials may have a mesh size (referring to the stacking of two sieves or screens, indicating that the particulates would pass through a screen size of the first number and be trapped by the screen size of the second number) of 18/35, 20/40, 25/45, 30/50, 35/60, 40/70, 45/80, or 50/100.

In one or more embodiments, the doped particulate material may be mixed into a wellbore fluid composition. The amount of doped particulate material mixed into the wellbore fluid composition may be from about 0.25% to 5% by weight of the composition. Further, it is understood that other amounts may be used, but when the doped particulate material is present in the wellbore fluid within this example range, the methods of the present disclosure may be conducted The wellbore fluid composition that includes the doped particulate material is generally not limited by this disclosure and may be an aqueous-based fluid or an oil-based fluid. As described below in further detail, it is envisioned that the doped particulate material of the present disclosure may be used in a variety of wellbore applications, and thus in a variety of wellbore fluids. For example, in one or more embodiments, the wellbore fluid including the doped particulate may be a cementing fluid, drilling mud, fracturing fluid, etc. Depending on the particular wellbore application being used, the wellbore fluid composition may vary. For example, in a cementing fluid, in addition to the doped particulate, the cementing fluid may include one or more cementious materials such as mixtures of lime, silica and alumina, lime and magnesia, silica, alumina and iron oxide, cement materials such as calcium sulphate and Portland cements, and pozzolanic materials such as ground slag, or fly ash, aluminosilicates and silicates that include ASTM Class C fly ash, ASTM Class F fly ash, ground blast furnace slag, calcined clays, partially calcined clays (e.g., metakaolin), silica fume containing aluminum, natural aluminosilicate, feldspars, dehydrated feldspars, alumina and silica sols, synthetic aluminosilicate glass powder, zeolite, scoria, allophone, bentonite and pumice. Further, other components (such as accelerators, retarders, fillers or aggregates, dispersants, fluid loss agents, loss circulation material, etc.) or types of cements may be used, as known in the art, and the fluid may be weighted such as to 7 to 24 pounds per gallon or 10 to 20 pounds per gallon, depending on the particular well in which the cement is being used.

Further, it is also envisioned that the doped particulate material may be used in a drilling fluid, for example, which may include water- or oil-based fluids (including emulsions). Such fluids may also include other components including weighting agents, bridging agents, fluid loss control agents, viscosifiers, loss circulation materials (fibers, graphite, calcium carbonate, celluloses, micas, sands, diatomaceous earth, calcium silicates, nut hulls), etc.

In one or more embodiments, the wellbore fluid including the doped particulate materials may be used in a hydraulic fracturing fluid for fracturing the formation. Such fluids may include, in addition to the doped particulate materials of the present disclosure, one or more proppants (not doped), gelling agents, etc. Further, the doped particulates may also be included into other wellbore fluids types for different applications. For example, the doped particulate materials may be included in a chemical wash or viscous spacer that is pumped ahead of a cement composition, or they may be included in a fluid pill pumped with a weighted or non-weighted spacer meant to separate the cement from the drilling fluid. In one or more embodiments, the doped particulate materials may be included in a fluid or pill to treat lost circulation, which may allow for the lost zone to be located via logging.

Methods of Using Compositions Including Doped Particulates

The wellbore treated with the doped particulate material may be logged with a logging tool, which may be integral with the drill string (such as a logging while drilling (LWD) tool disposed inline with the drill string a distance above the drill bit), on a wireline, conveyed on coiled tubing, via slickline etc. Regardless of the system on which the logging tool is used, a neutron source is used to provide neutrons to the near wellbore region of the formation. Neutrons interact in element specific ways with the atoms that they encounter in the near wellbore area and these interactions produce species, or the lack thereof, that may be detected by detector(s) within the logging tool. The chemically unique nature of the dopant in the doped particulate materials used in the present disclosure may allow for their unambiguous detection by the evaluation of the signals logged by the logging systems. Further, the magnitude of the detected signal may be used to determine concentrations of the doped particulate materials in a particular region of the wellbore or formation. From the logged data, the volume of the "carrier fluid" (e.g., the cement composition or the wellbore fluid composition) present in a particular location may be determined, assuming that no dilution or concentration of the doped particulate material has occurred.

For example, in one or more embodiments, a cement composition including doped particulate materials may be pumped downhole and allowed to set up in the annular space between the casing and the wellbore wall or formation (or between concentric strings of casing). The doped particulate materials may be added to the cement composition either before the cement composition is pumped downhole or during the pumping of the cement composition downhole. After the cement is allowed to set up, a logging tool may be used to log the wellbore from the casing shoe to an estimated top-of-cement. During the measurement, the logging tool will detect the doped particulate materials where there is cement and will have no response where there is a lack of cement, and therefore a location of the top-of-cement may be determined by examining the collected wellbore log. In one or more embodiments, the logging run may be made during the trip of the drill string (by an LWD tool) into the wellbore to drill the casing shoe and subsequent open-hole section of the wellbore. In other embodiments, the logging run may be made after multiple casing strings have been set if the log was not acquired immediately after setting the original casing. Thus, in accordance with the present disclosure, the measurements may be taken through multiple concentric casing strings. Thus, it is envisioned that in such an instance, the doped particulate may be varied (type or amount) between the annuli.

Further, when the concentration of the doped particulate material in the cement composition is known, the volume of cement in the logged annulus can be determined based on the magnitude of the signal detected by the logging tool because the signal detected is directly proportional to the concentration of the doped particulate materials. In addition to determining the location of the top-of-cement, the traced cement may be used to validate the cement job design, allowing for improved assurance, in combination with other techniques, that zonal isolation has been achieved. The presently achieved logs may optionally also be combined with one or more other measurements, such as pressure responses, to achieve an integrated determination concerning zonal isolation.

In one or more embodiments, the doped particulate materials may be added only to an initial portion of the cement composition pumped downhole, because the initial such portion will eventually flow through the annular space and form the top-of-cement. For example, the doped particulate materials may be added only to the initial 100 barrels of the cement composition pumped downhole. In this way, the amount of doped particulate materials used in a cementing operation may be minimized. However, it is also envisioned that the doped particulate may be in any portion of, including throughout, the annulus. Thus, the doped particulate may be dry blended into the cementious material mix (throughout the mix or in a batch mixing), or may be mixed on the fly into a mixing tank (in which the fluid is mixed) and pumped downhole.

In one or more embodiments, a cement composition including doped particulate materials may be used in a squeeze slurry that may be injected into only a small portion of the annulus after perforating an emplaced casing. For example, a squeeze slurry may be used in remedial wellbore work, to make sure that a water producing zone has been isolated from an oil producing zone, or in abandonment operations. A logging run following injecting the squeeze slurry would then detect the doped particulate materials located in the cement composition and may be capable of informing an operator if the squeeze slurry was emplaced in the correct place (such as when sealing off selected intervals of a dry hole or depleted zones by placing a cement plug at the required depth to help prevent zonal communication and migration of fluids), if there was a particular loss zone, where a channel was and/or up to what depth the channel was filled. Additionally, in one or more embodiments, a cement composition including doped particulate materials may be used as a cement plug for treating lost circulation. Further, when plugging and abandoning a well, a cement composition including doped particulate materials may be used to determine if the cement has entered, for example, the b- or c-annulus and/or whether the cement has moved up or down.

However, as mentioned above, the doped particulates of the present disclosure are not limited to the tracing of cementing fluids. Rather, wellbore fluids, generally, that include doped particulate materials may be pumped downhole to enable a subsequent logging run to provide a variety of useful information to operators. For example, when an operator experiences fluid loss or lost circulation events in a wellbore, the doped particulate materials may be added on-demand to the wellbore fluid being pumped downhole so that they will be circulated into the loss zones, selectively emplacing the doped particulate materials therein. In some embodiments, the doped particulate material containing fluid may be flushed out of the wellbore with a non-doped fluid prior to logging so that only the doped particulate materials contained in the loss zone remain. It is also envisioned that the doped particulate may be run as a background additive. A logging run (by the LWD tool already present in the wellbore or by wireline) after the circulation will then be able to detect the location of the loss zone by detecting the presence of the doped particulate materials therein. Precision in the location of a lost circulation zone or other damaged zones (such as through drilling induced fractures) may allow for better and more accurate (such as volume of treatment needed) spot treatments when emplacing a pill treatment or using a cement squeeze. Given that the fluid in the loss or damaged zone and within the wellbore generally may be the same fluid, identification of such zones may be made through flux scattering functions, such as described in an example in greater detail below. In addition to location of drilling induced fractures when experiencing lost circulation events, the doped particulate materials may also be used to locate the location (and optionally geometry) of hydraulic fractures as well.

In other embodiments, a wellbore fluid including the doped particulate materials may be circulated downhole for a sufficient period of time so that the wellbore fluid completely flushes the pore space within the logging tools measurement depth. When the concentration of the doped particulate material in the wellbore fluid is known, the pore volume of the logged formation can be determined based on the magnitude of the signal detected by the logging tool because the signal detected is directly proportional to the concentration of the doped particulate materials, allowing for an independent measurement of porosity.

In one or more embodiments, a wellbore fluid including doped particulate material may be pumped downhole, the wellbore be logged with a logging tool, a cement composition including doped particulate material pumped downhole and the wellbore logged again with the logging tool. Using the combination of data achieved from logging after the wellbore fluid is pumped and the logging after the cement composition is pumped may inform and operator if any differences or deficiencies in the cementing operation occurred. In some embodiments, the same dopant for the particulate material may be used in both the wellbore fluid and in the cement composition, while in other embodiments different dopants may be used in the wellbore fluid and the cement composition.

The methods used by the logging systems may be based on sigma measurements, inelastic spectroscopy, or on capture gamma ray spectroscopy. In particular embodiments, the logging tool may include an Am—Be neutron source in combination with a detector surrounded by a boron sleeve. When using sigma log measurements, flux sensitivity or scattering functions (FSFs) may be used to describe/model a detector's response to a perturbation at a point in space a certain distance from said detector. For example, the use of FSFs can be used to model or predict the detector response to a doped particulate material containing fluid at a defined location in three-dimensional space around the detector located on a logging tool. FSFs may be derived from a feature in the Monte Carlo Nuclear Particle (MCNP) code. By modeling a variety of logging scenarios (e.g., varying casing thickness, wellbore fluid/cement composition, formation composition/geometries, etc.), MCNP can also be used to build a database of responses that can inform decisions regarding the feasibility of using a doped particulate material in a particulate operation or to help interpret data obtained by a logging run. The examples presented below provide further illustration on how the modeling works.

EXAMPLES

Example 1

A cement having a composition as shown in Table 1 was used to compute the nuclear properties of the cement slurry using the Schlumberger Nuclear Parameters (SNUPAR) program. SNUPAR is capable of computing the sigma, hydrogen index, and other parameters of compositions when their chemical makeup is entered.

TABLE 1

Concentration of Doped
Particulate Material (DPM): 1%
Note, all elements are included e.g. Hydrogen
EDX Mass Fraction of 16.4 ppg silica
cement 1.966

| | | Atomic Weight | Cement | DPM | Cement + DPM | Wt % |
|---|---|---|---|---|---|---|
| C | Carbon | 12.01 | 2.72 | 0.00 | 2.69 | 0.026929 |
| O | Oxygen | 16.00 | 40.39 | 50.06 | 40.49 | 0.404913 |
| H | Hydrogen | 1.00 | 3.20 | | 3.17 | 0.03168 |
| Na | Sodium | 23.00 | 0.17 | 0.00 | 0.17 | 0.001725 |
| Mg | Magnesium | 24.30 | 0.29 | 0.00 | 0.29 | 0.002875 |
| Al | Aluminium | 26.98 | 1.35 | 0.00 | 1.33 | 0.013321 |
| Si | Silicon | 28.09 | 17.40 | 43.94 | 17.67 | 0.1767 |
| P | Phosphourus | 30.97 | 0.14 | 0.00 | 0.13 | 0.001342 |
| S | Surfur | 32.07 | 1.07 | 0.00 | 1.06 | 0.010637 |
| Cl | Chlorine | 35.45 | 0.87 | 0.00 | 0.86 | 0.008625 |
| K | Potasium | 39.10 | 0.25 | 0.00 | 0.25 | 0.002492 |
| Ca | Calcium | 40.08 | 30.18 | 0.00 | 29.88 | 0.298804 |
| Fe | Iron | 55.85 | 1.96 | 0.00 | 1.94 | 0.019358 |
| Gd | Gadolinium | 157.25 | 0.00 | 6.00 | 0.06 | 0.0006 |
| | Total | | 100.00 | 100.00 | 100.00 | 1 |

The resulting sigma of the doped particulate material containing cement as a function of the gadolinium concentration in the doped particulate material is shown in FIG. 1. The cement without the gadolinium present has a sigma value of 28.5, while adding 10 wt. % gadolinium to a particulate material added at 1 wt. % to the cement increases the apparent sigma to 400. However, with this model the apparent sigma values obtained is for a measurement of 100% cement, but the cement sheath in practice is relatively thin so the neutrons used in the actual measurement will encounter other compositions than the cement composition.

Geometrical factors can be included in the model to account for the thinness of the cement sheath. The geometrical factors are computed by integrating the axial and azimuthal flux sensitivity maps resulting in the radial geometric factor seen in FIG. 2. The LWD tool EcoScope, available from Schlumberger, is capable of three unique sigma measurements, each with increasingly deeper depths of investigation (e.g., shallow, medium, and deep). The discrete points in FIG. 2 relate to values obtained from FSFs, while the solid lines are the equations fit to the data points. The axial and azimuthal sensitivities are collapsed into the radial direction since the measurement does not have azimuthal sensitivity and it has been assumed in this example that the cement property does not change in the axial direction over the length-scale where the measurement is sensitive. These geometrical factors are used with a linear volumetric response equation to determine the response of the actual measurements to the volumes present as a function of radius from the borehole wall.

Figure 3:
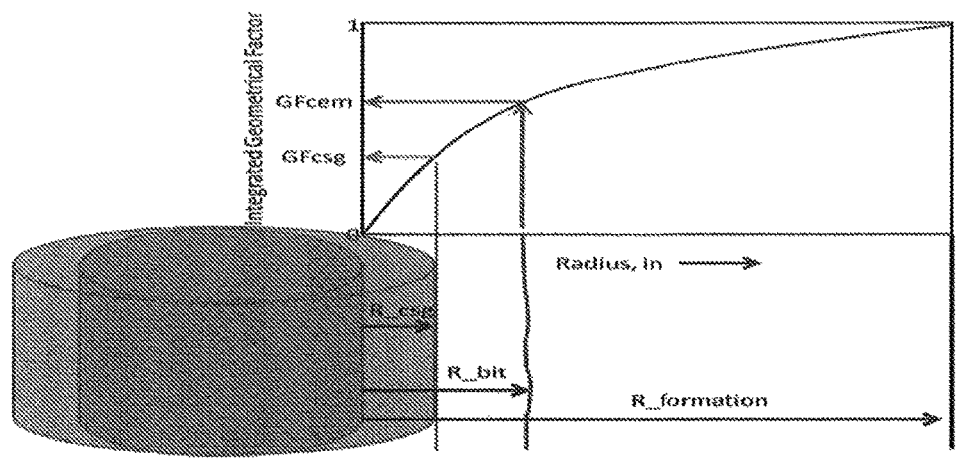
FIG. 3 shows the geometry of a borehole with casing, cement sheath, and formation and the geometrical factors at the casing and cement outer diameters.

FIG. 3 shows the geometry of a borehole with casing, cement sheath, and formation and the geometrical factors at the casing and cement outer diameters. Including the geometrical factors, Equation 1 is the volumetric formulation used to compute the sigma measurement response:

$$\Sigma_{log} = \Sigma_{FE}(GF_{csg}) + \Sigma_{cement}(GF_{cement} - GF_{csg}) + \Sigma_{formation}(1 - GF_{cement}) \quad (1)$$

where
$\Sigma_{FE}$=sigma of the casing
$\Sigma_{cement}$=sigma of the cement as determined from the cement composition and SNUPAR as shown in FIG. 1 for example.
$\Sigma_{formation}$=sigma of the formation
$GF_{csg}$=GF at the radius of the casing, computed from known casing geometry There can be cases where the cement does not completely fill the annular volume. Equation 1 can be re-arranged as Equation 2 as follows to compute the volume of cement in the annulus to determine if it has filled the entire space available. Equation 2 is as follows:

$$GF_{cement} = \frac{\sum_{log} - \sum_{FE}(GF_{csg}) + \sum_{cement}(GF_{csg}) - \sum_{formation}}{(\sum_{cement} - \sum_{formation})} \quad (2)$$

where the appropriate geometrical factors are computed as a function of radius using the outside diameter of the casing and the borehole diameter. The sigma of the steel casing computed from SNUPAR is 220 in this example and the sigma of the cement is calculated from SNUPAR as a function of the cement composition and gadolinium concentration as described previously. The sigma of the formation is taken to be 30 in this example. In an actual well, the sigma of the formation can be obtained from a logging pass taken previous to the cement operation or computed from a combination of other logging measurements, most appropriately natural gamma ray, neutron porosity and elemental spectroscopy, which can inform on the composition of the formation.

Figure 2:
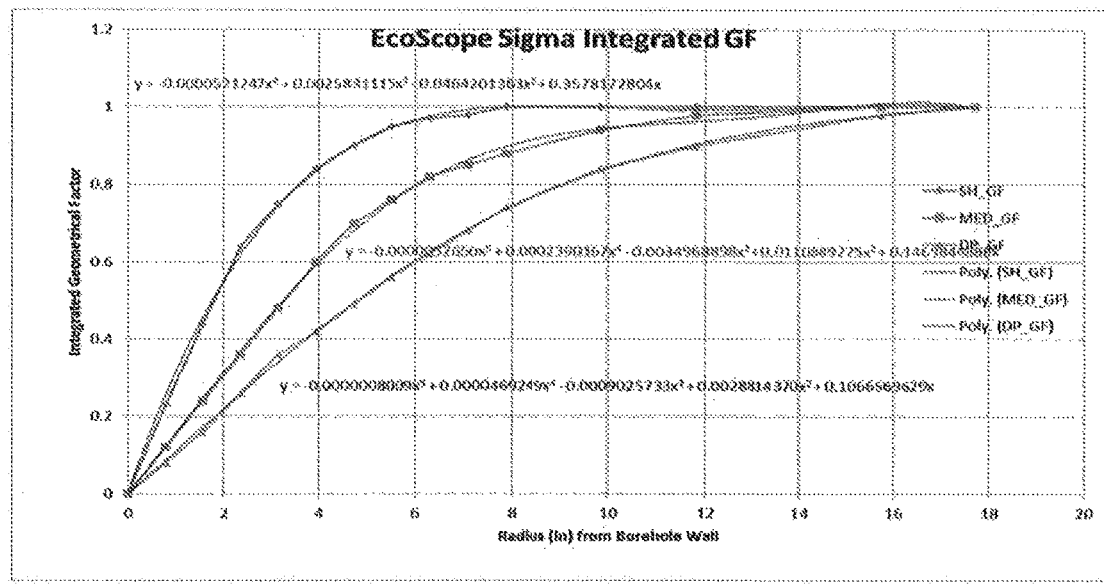
FIG. 2 shows a plot of the radial geometric factor used in the model described in Example 1.

All of the terms on the right hand side of Equation 2 are known or measured, allowing $GF_{cement}$ to be computed. FIG. 2 and the equations shown on the plot can then be used to compute the radius of the cement sheath. If this is less than or greater than the measured borehole radius, the cement does not fill the annulus.

It may be more practical to use the term ($GF_{cement} - GF_{csg}$) to compute the volume of cement in the annulus. The volume would be represented by Equation 3:

$$\text{Volume}_{cement} = \pi*(R_{cement}^2 - R_{csg}^2)*h \quad (3)$$

where
$\text{Volume}_{cement}$ is the volume of cement over the height (h), ($R_{cement}^2 - R_{csg}^2$) is the difference in the casing and cement sheath radius. The equations in FIG. 2 allow for the conversion of the computed geometrical factors from Equation 2 to be converted to a radius for use in Equation 3. The percentage of cement filling the annulus can be computed as shown in Equation 4:

$$100 * \frac{Vol_{cement}}{Vol_{annulus}} \quad (4)$$

As expected, the shallow sigma measurement shows the most sensitivity to the cement sheath characteristics because it is measuring a larger relative proportion of the cement. For example, the relative thickness of the cement sheath is important as shown by comparing FIGS. 4 and 5, which show the sigma values for a cement containing 1 wt. % doped particulate material with varying loadings of dopant. Given that in an actual logging run the formation sigma will vary with depth, it would be more difficult to distinguish top-of-cement with a 9.625 inch casing in a 10.626 inch borehole (FIG. 4), than in a situation of a 9.625 inch casing in a 12.25 inch borehole (FIG. 5) because the annulus in the situation represented in FIG. 5 will be thicker and thus there may be a thicker amount of cement containing doped particulate material to measure.

Figure 4:
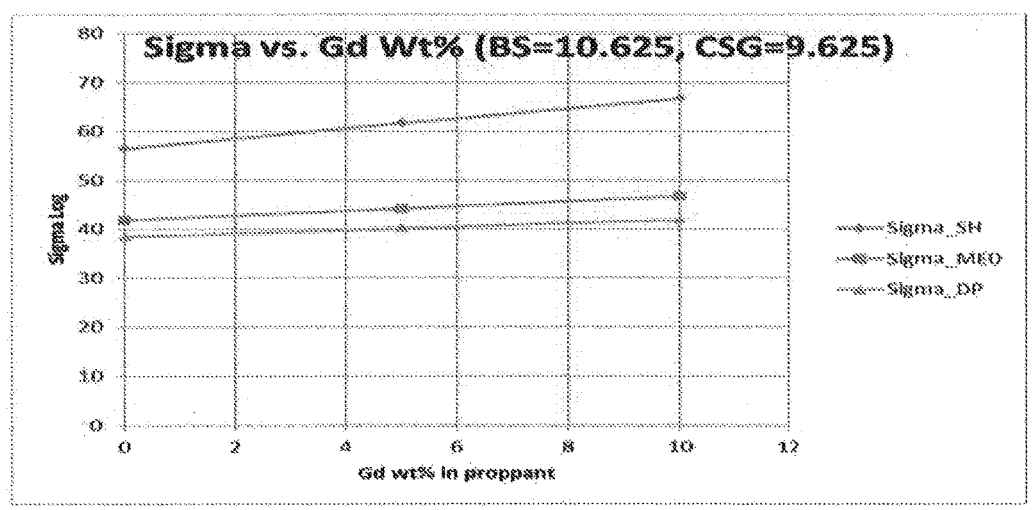
FIG. 4 shows a plot of sigma values for a cement containing 1 wt. % doped particulate material with varying loadings of dopant in a 10.625 in. borehole with a 9.625 in. casing.

Specifically, the practical use of the modeling is to show that for the given situation described in FIG. 4, the shallow sigma measurement would read approximately 57 where there was no cement, and approximately 67 when there was a sheath of cement having 1% doped particulate material with 10 wt % gadolinium filling the annulus. Given situation described in FIG. 5, the shallow sigma measurement would still read approximately 57 where there was no cement, but read approximately 150 when there was a sheath of cement having 1% doped particulate material with 10 wt % gadolinium filling the annulus. This difference in signal would be used to detect the measured depth where the top-of-cement is located and a larger difference would provide more resolution and easier detection of the top of cement.

The above calculations and used a one-dimensional approach while the annulus is in fact a three-dimensional volume having axial, radial, and azimuthal dimensions with respect to the wellbore. Axial is taken to be along the wellbore trajectory, radial in the direction into the formation, and azimuthal is circumferential about the axial direction. The geometrical factors in FIG. 2 are integrated in the axial and azimuthal directions, leaving only the radial sensitivities. For measurements with azimuthal sensitivities, the integration can be performed only in the axial direction, leaving the azimuthal and radial sensitivities. This would allow for a two-dimensional map of cement volume.

To consider the axial response of the measurement, the full three-dimensional FSFs would be used, allowing for a three-dimensional map of cement volume to be computed. This volume could be used to compare to the annular volume to determine if the cement has fully filled the annular volume. When the cement does not fully occupy the annular volume, fluids could move from the permeable formations to the annulus and then into other permeable formations up-hole or to the surface causing a blowout. FIG. 2 shows that three sigma measurements are available from the EcoScope tool. This may be the case for other tools also. The three independent measurements can be use simultaneously in an inversion to find the best value of the cement radius or used independently to better determine the cement geometry.

Example 2

Figure 5:
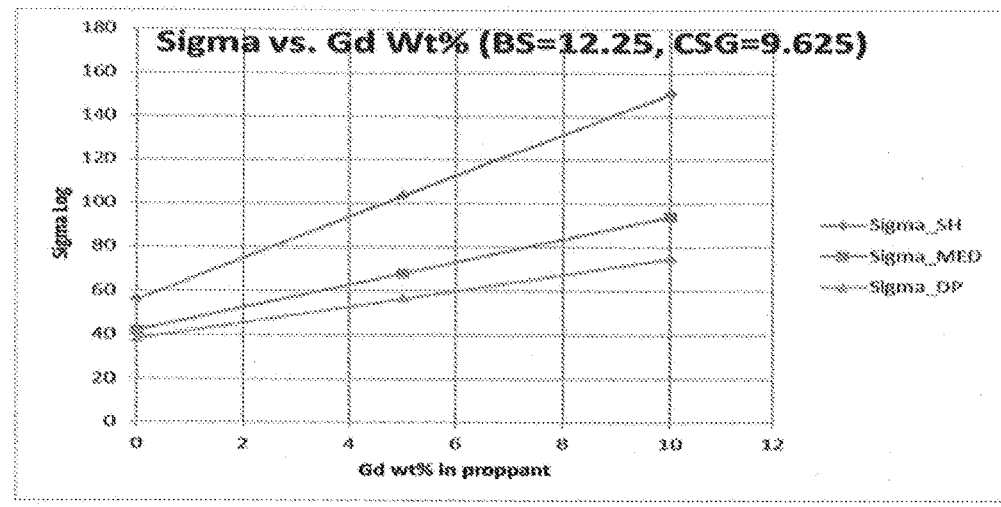
FIG. 5 shows a plot of sigma values for a cement containing 1 wt. % doped particulate material with varying loadings of dopant in a 12.25 in. borehole with a 9.625 in. casing.
Figure 6:
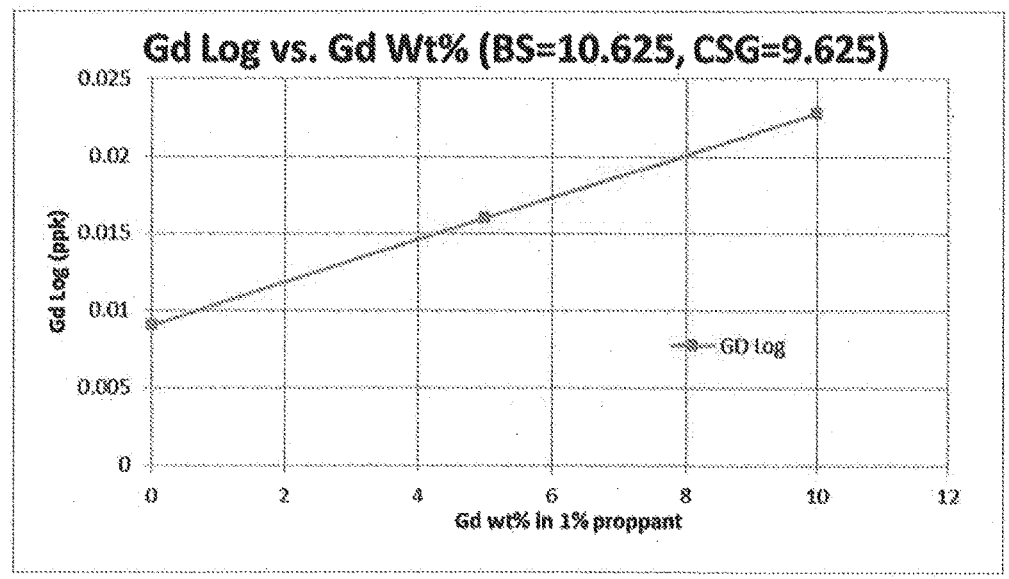
FIG. 6 shows a plot of results from the Capture Gamma Ray Spectroscopy described in Example 2.

In this example Capture Gamma Ray Spectroscopy for detecting doped particulate material is demonstrated. When gadolinium (or other dopants listed above) is used as a dopant, spectroscopy measurements respond to the element directly and the parts per thousand (ppk) Gadolinium is output as a log. Thus, there is no need to use SNUPAR to compute the cement mixture's and other components' response as with the sigma measurements. When using the EcoScope tool, the spectroscopy measurements use the same detector as the medium sigma measurement, use neutron capture gamma rays as their measurement signal and therefore have similar geometrical factors as the medium sigma. Spectroscopy measurements would therefore encompass the cement annulus as well as the formation properties beyond the cement. A typical response equation is similar to the response equation for sigma and shown below as Equation 5:

$$Gd_{log}=Gd_{FE}(GF_{csg})+Gd_{cement}(GF_{cement}-GF_{csg})+Gd_{formation}(1-GF_{cement})$$ (5)

where
$Gd_{FE}$=Gadolinium content of the casing
$Gd_{cement}$=Gadolinium of the cement as determined from the cement composition as shown in FIG. 5 for example.
Gd=Gadolinium of the formation
$GF_{csg}$=GF at the radius of the casing, computed from known casing geometry FIG. 6 shows that with no Gadolinium in the cement, the log will read the formation gadolinium content (0.01 in this example) times the formation geometrical factor (third term in equation 5). This value is 0.008, slightly less than the formation gadolinium content due to the presence of the casing and relatively large hole size. When 10 wt % Gadolinium is added to the doped particulate materials accounting for 1 wt. % of the cement, FIG. 6 shows that the log reading will increase by about 100% to 0.023 ppk whereas the medium sigma measurement only increases by a factor of 20% (see FIG. 4). Thus, spectroscopy measurements are more sensitive to the gadolinium laced cement as compared to sigma measurements.

Equation 2 can be used to find the annular volume of cement in the annulus in a similar manner as described for sigma previously. In one or more embodiments, the spectroscopy measurement may be used in place of or in conjunction with sigma.

Example 3

As mentioned above, MCNP can be used to compute a database of log responses for both sigma and ECS for gadolinium, manganese, or any other trace element added to the wellbore fluid/cement that can be measured. Various configurations of casing diameters, casing weights, borehole sizes, percent volume of cement in the annular volume can be modeled and the logging tool response placed in a multi-dimensionless table. This table could be used in an inversion to determine the top-of-cement and volume of cement in the annulus using the input measurements and specific borehole configuration and hardware. An inversion in this way could be a more robust method for cases having multiple casing strings.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of performing a wellbore operation, comprising:
circulating a doped wellbore fluid comprising a non-radioactive doped particulate material in a wellbore; and
logging the wellbore with a logging-while-drilling tool to determine at least one characteristic of the doped wellbore fluid,
wherein logging comprises performing at least three sigma measurements, and wherein each of the sigma measurements are performed with increasingly deeper depths of investigation.

2. The method of claim 1, wherein the doped wellbore fluid is a cementing fluid that is circulated into an annulus between a formation wall and a casing string.

3. The method of claim 2, wherein the at least one characteristic comprises top-of-cement or a volume of the doped wellbore fluid.

4. The method of claim 1, wherein the at least one characteristic comprises location of fractures.

5. The method of claim 4, wherein the fractures are drilling induced and the circulating occurs upon experiencing lost circulation of a wellbore fluid.

6. The method of claim 4, wherein the fractures are hydraulic fractures.

7. The method of claim 1, further comprising: determining if zonal isolation is achieved based on the at least one characteristic.

8. The method of claim 1, further comprising: squeezing the doped wellbore fluid into perforations in a casing and determining if zonal communication is present.

9. The method of claim 1, wherein the doped particulate material comprises about 0.025% to about 10% by weight of dopants.

10. The method of claim 1, wherein the doped particulate material comprises at least one of boron, cadmium, gadolinium, iridium, manganese, or mixtures thereof.

11. A method of performing a wellbore operation, comprising:
circulating a doped wellbore fluid comprising a non-radioactive doped particulate material in a wellbore;
logging the wellbore with a logging tool; and
determining a location of at least one fracture by elemental spectroscopy measurements,
wherein logging comprises performing at least three sigma measurements, and wherein each of the sigma measurements are performed with increasingly deeper depths of investigation.

12. The method of claim 11, wherein the doped particulate material comprises about 0.025% to about 10% by weight of dopants.

13. The method of claim 11, wherein the doped particulate comprises at least one of boron, cadmium, gadolinium, iridium, manganese, or mixtures thereof.

14. A method of performing a wellbore operation, comprising:
circulating a doped cement fluid comprising a non-radioactive doped particulate material in a wellbore and into an annulus between a formation wall and a casing string;
logging the wellbore with a logging tool; and
determining at least one characteristic of the doped cement fluid by performing at least three sigma measurements, wherein each of the sigma measurements are performed with increasingly deeper depths of investigation.

15. The method of claim 14, wherein the at least one characteristic comprises volume of cement behind the casing string.

16. The method of claim 14, wherein the at least one characteristic comprises top of cement.

17. A method of performing a wellbore operation, comprising:

circulating a doped wellbore fluid comprising 0.25% to 5% by weight of a non-radioactive doped particulate material in a wellbore; and logging the wellbore with a logging system having a neutron source, wherein logging comprises performing at least three sigma measurements, and wherein each of the sigma measurements are performed with increasingly deeper depths of investigation.

18. The method of claim 17, wherein the doped particulate comprises about 0.025% to about 10% by weight of dopants.

19. The method of claim 17, wherein the doped particulate material comprises at least one of boron, cadmium, gadolinium, iridium, manganese, or mixtures thereof.

20. The method of claim 17, wherein the doped particulate material is at least one of a ceramic proppant, sand, resin coated sand, plastic beads, glass beads, and resin coated proppants.

* * * * *